Dec. 31, 1946.                 C. F. CARTER                    2,413,290
              JACKING ATTACHMENT FOR REAR WHEELS
                        Filed Oct. 8, 1945
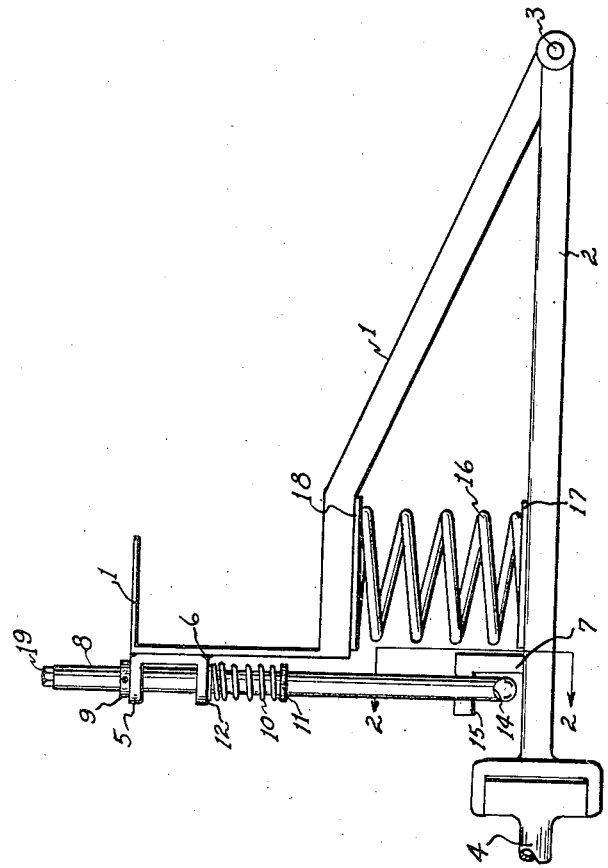
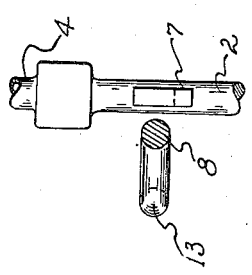
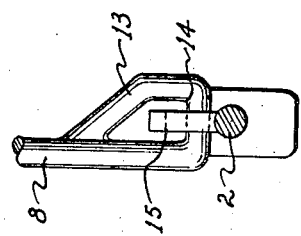
INVENTOR.
CLARENCE F. CARTER
BY Benedict & Swartwood
ATTORNEYS Patented Dec. 31, 1946

2,413,290

UNITED STATES PATENT OFFICE 2,413,290

JACKING ATTACHMENT FOR REAR WHEELS

Clarence F. Carter, Danville, Ill.

Application October 8, 1945, Serial No. 621,024

6 Claims. (Cl. 280—150)

This invention relates to a device to be attached to an automobile to assist in jacking the automobile and is particularly useful in such connection when a tire is deflated. It relates particularly to a device to be attached to the rear wheels and frame of a car having conventional knee action.

In cars employing knee action the frame of the car is attached to the axle through a yieldable connection comprising a spring and pivotal members in order to give the car easy riding qualities. The trend of the modern cars is to lower the axle and related cooperative parts for the purpose of improving stability and riding qualities. The combination of lowering the car closer to the ground and the use of knee action makes it almost impossible to jack a car by placing the jack under the axle or a member attached to the axle when a tire is deflated because there is not enough room between the axle of the car and the ground to place on ordinary car jack under the axle. Furthermore if the jack were placed under a member attached to the frame such as the car bumper, it is impossible to lift the axle and the wheel from the ground without first raising the spring portion of the flexible connection to the limit of flexibility and thereafter lifting the axle with the frame through the tensile strength of the spring member. This requires raising the jack throughout a considerable distance vertically before the axle and frame will be lifted together which is impractical if not impossible using the ordinary car jack. Furthermore such lifting tends to be harmful to the spring member and to the knee action.

It is therefore an object of the present invention to attach to the car a permanent device which makes it possible to lift the wheel and tire assembly from the ground by means of an ordinary jack or lifting device applied to a member attached to the frame of the automobile such as the protruding bumper. By such an attachment other special equipment is not necessary and the ordinary car jack may be used.

It is a further object of the invention to attach my device to the frame of a car and to position the device in cooperative manner with the knee action of the rear axle which, when a jack is applied to the rear bumper, will minimize the amount of vertical movement of the jack before the frame and the axle will be locked and then raised in locking position.

It is also an object of the invention to position the locking means sufficiently below the point where the locking is to occur to allow for the dropping of the axle a distance equal to or slightly greater than the amount of drop due to a deflated tire and still permitting the locking device to engage and lock the frame to the axle during the jacking operation. The devices previously used for this purpose have not taken into account this factor and have therefore been found to be impractical.

It is also an object of this invention to provide a cheap and economical locking device. This is an essential feature of my device and is important since accessories of this kind must not only be practical in their operation but economical in their construction or the car user will not employ them.

It is a further object of the invention to provide a spring means attached to my device which prevents rattling of the device when it is not in use.

Another important object of my device is to position the device so that it may be turned into engaging position from a point substantially above the axle of the car such as through a hole under the hood, a hole within the trunk compartment or a hole in the fender. This completely eliminates the necessity of the user or others from crawling under the car and getting dirty, as well as making it generally convenient. All that is necessary in my device is to take an ordinary wrench and from a standing position insert it through a hole in the body of the car and then turn the device to locking or engaging position. This operation locks the frame to the axle and an ordinary jack inserted under the bumper will jack the car with a minimum amount of movement of the jack.

Other advantages, objects and uses of my invention will become apparent by referring to the drawing in which Figure 1 shows a front view of the device turned in engaging position. Figure 2 is a side view of the device turned in engaging position. Figure 3 is a partial plan view of the device in non-engaging position showing how the device does not interfere with the yieldable connection when not in use.

Referring to the drawing, the frame 1 of the car has a pivotable horizontal knee-action member 2 pivotally attached at 3. The wheel and tire assembly is attached in the usual manner at 4. A support 5 is welded to the frame 1 at 6. An inverted L-shaped hook 7, although other shaped hooks may be used, is welded to the member 2. A rod 8 is journalled in support 5. An annular ring 9 is keyed to the rod 8 and bears on the upper edge of the support 5 thus providing the means for locking the axle to the frame when the device is turned into engaging, locking or operating position.

Spring 10 is positioned around the rod 8 and keyed to the rod 8 at 11 and the spring 10 is also fastened to the lower edge of the support 5 at 12. The primary purpose of the spring is to prevent rattling of the device when it is not in use. It should be noted that in my device the spring has no function in raising the axle and frame of the vehicle. The entire bearing surface, except for the engagement of the hooks, is between the upper edge of support 5 and th ring 9. An eye-shaped hook 13 attached to the rod 8 is preferably used although an L-shaped hook could be used within the scope of my invention. When the rod 8 is turned into engaging position, the eye-shaped hook 13 will engage the L-shaped hook 7 when an upward force is exerted to the frame or a member attached to the frame such as the protruding bumper, the frame and axle will be lifted together in locking position.

One of the main features of my device is that the bearing surface 14 of the hook 13 is positioned sufficiently below the lower edge 15 of the L-shaped hook 7 to permit the hook 7 to drop with member 2 a distance equal to the amount of drop caused by a deflated tire, in order that the rod 8 may be turned so that the hook 13 will engage the hook 7. The exact distance between points 14 and 15 will vary depending upon the make of the car and upon the size of the tire. Some tolerance over and above such drop is necessary which means that a jack under the bumper will be raised until the hooks 7 and 13 engage but this vertical movement of the jack is small compared to the distance necessary when my device is not used as heretofore explained.

Another important feature of the invention is best illustrated in Figure 3. In Figure 3 the rod 8 has been rotated 180° from that shown in Figures 1 and 2. Thus the hook is in normal or non-engaging position and it is readily seen that there is sufficient room between the hook 13 and the member 2 to permit free movement of the yieldable connection between the frame and the axle which comprises the pivotable member 2, and the spring 16 attached to member 2 at 17 and to the frame at 18. Also as shown in Figure 3 the device when turned in non-engaging position does not come into contact with hook 7 which also permits the free movement or the knee action of the vehicle.

A nut 19 is attached to the rod 8. The rod 8 extends above the vertical support 5 a sufficient distance so that a wrench may be applied to the nut 19 from a point substantially above the axle in order to permit the operator to turn the device without crawling under the car. In general practice when using my device, a hole is cut into the vehicle body directly above the nut 19 which may be a hole through the body inside the trunk compartment or in some cars it may be a hole through the fender. The exact position of the hole in the body of the car to obtain access to the nut 19 will vary with the make of the automobile.

Other modifications of my device may be made within the scope of my invention. My invention is only limited by the following claims.

I claim as my invention:

1. An apparatus substantially as described for locking the frame of a vehicle with the axle in which the frame and axle are normally yieldably connected by a spring and knee action comprising a first hook attachable to the axle; a vertical support attachable to the frame of the vehicle aligned substantially vertically with the first hook; a rotatable rod mounted in said support rotatable about a vertical axis and journalled in said support; a second hook on said rod adapted and arranged to engage the first hook when the rod is rotated to operative position to thereby couple the axle and frame together to enable the axle to be lifted with the frame when an upward force is exerted on the frame and said second hook further adapted and arranged such that when it is not engaged with the first hook free movement of the yieldable connection between the frame and the axle is obtained.

2. The apparatus of claim 1 further defined in that the first hook comprises an inverted L-hook and the second hook is an eye hook.

3. The apparatus of claim 1 further defined by means comprising a spring attached to the lower end of the support around said rod and to said rod to prevent rattling when the two hooks are not engaged in operating position.

4. The apparatus of claim 1 further defined by means for rotating the rod comprising a nut on the end of the rod opposite the hook and said rod positioned and extending sufficiently upward to permit turning of the rod by a wrench from a point substantially above the frame of the vehicle.

5. The apparatus of claim 1 further characterized by means for having the hook on the rod extending sufficiently below the hook on the axle when in non-engaging position for allowing sufficient room for the first hook to be turned into engaging position with the second hook when the axle is lowered due to a deflated tire.

6. An apparatus substantially as described for locking the frame of a vehicle with the rear axle in which the frame and rear axle are normally yieldably connected by spring and knee action comprising an L-shaped hook attachable to the axle in inverted position; a vertical support attachable to the frame of the vehicle and aligned generally vertically with the L-shaped hook; a rotatable rod journalled in said support, a collar keyed to said rod and adapted to bear on the upper edge of said support thereby forming the bearing means for raising the frame and axle together when upward force is exerted on the frame; an eye-shaped hook on the lower end of said rod adapted and arranged to engage the first hook when the rod is rotated to operative position, the eye-shaped hook adapted and arranged in a relationship with the L-shaped hook such that the bearing surface of the L-shaped hook and the eye-shaped hook are normally sufficiently apart to enable the rod and the eye-shaped hook to be turned into engaging position with the L-shaped hook when the axle is lowered due to a deflated tire; and said eye-shaped hook further adapted and arranged such that when the rod is turned into non-engaging position free movement of the yieldable connection between the frame and the axle is obtained; a spring attached to the lower end of the support around said rod and to said rod to prevent rattling when the two hooks are not engaged in operating position; and means for rotating the rod comprising a nut on the end of the rod opposite the hook with said rod positioned and extending sufficiently upward to permit turning of the rod by a wrench from a point substantially above the frame of the vehicle.

CLARENCE F. CARTER.